United States Patent [19]

Baston et al.

[11] 4,260,121

[45] Apr. 7, 1981

[54] DRIVE ARRANGEMENT FOR LIFT CONTROL SURFACES ON ALL AIRCRAFT WINGS

[75] Inventors: Trevor A. J. Baston, Albrighton; John R. Wynne, Finchfield, both of England

[73] Assignee: Lucas Industries Limited, Birmingham, England

[21] Appl. No.: 852,823

[22] Filed: Nov. 18, 1977

[30] Foreign Application Priority Data

Nov. 24, 1976 [GB] United Kingdom ............... 48904/76

[51] Int. Cl.³ .............................................. B64C 19/00
[52] U.S. Cl. ........................................ 244/213; 192/7; 74/711
[58] Field of Search ............... 192/7, 8 R, 9; 188/134; 303/97; 244/194, 213; 74/711

[56] References Cited

U.S. PATENT DOCUMENTS

| 2,834,010 | 5/1958 | Sierozki . | |
| 3,025,722 | 3/1962 | Edger et al. | 74/711 |
| 3,169,178 | 2/1965 | Notchev et al. . | |
| 3,288,232 | 11/1966 | Shepherd | 74/711 X |
| 3,802,529 | 4/1974 | Burckhardt et al. | 303/96 |
| 3,845,671 | 11/1974 | Sharp et al. | 74/711 X |
| 3,893,535 | 7/1975 | Burckhardt et al. | 303/96 |
| 3,935,754 | 2/1976 | Comollo | 244/213 |

FOREIGN PATENT DOCUMENTS 1396395 6/1973 United Kingdom .

Primary Examiner—Kenneth Dorner
Attorney, Agent, or Firm—Andrus, Sceales, Starke & Sawall

[57] ABSTRACT

A drive arrangement for lift control surfaces on an aircraft wing has a drive motor and a shaft for transmitting motion from the motor to the lift control surfaces. A control circuit is responsive to the driving positions of both the motor and the shaft, and is responsive to a predetermined level of discrepancy between these positions to operate one or more braking devices which restrain the shaft against movement.

9 Claims, 6 Drawing Figures

DRIVE ARRANGEMENT FOR LIFT CONTROL SURFACES ON ALL AIRCRAFT WINGS

This invention relates to a drive arrangement for lift control surfaces on an aircraft wing.

Aircraft wings are provided with a number of movable control surfaces, including lift control surfaces which are deployed during landing and take-off to increase wing lift. Any sudden reduction in the amount of lift may, in these circumstances, have disastrous results. Failure of the drive transmitted to a control surface on either wing will render that control surface liable to be moved by aerodynamic forces to a position of minimum lift. It is therefore desirable that any such failure should result in the control surface being locked in the position which it occupied when failure occurred. Moreover, in the event of drive failure to the lift control surface on one wing, it is necessary to prevent the lift control surface on the other wing from being driven away from a position which corresponds to that of the failed control surface.

It is an object of the invention to provide a drive arrangement for lift control surfaces in which the above requirements are met.

According to the invention a drive arrangement for lift control surfaces on an aircraft wing comprises a drive means, a shaft for transmitting drive from said drive means to said lift control surfaces, means for providing a first electrical signal which is a function of an amount of driving motion of said drive means, means for providing a second electrical signal which is a function of an amount of driving motion of said shaft, means for providing an output signal in response to a predetermined level of difference between said first and second signals, and means responsive to said output signal for restraining said shaft against driving movement.

A preferred embodiment of the invention in which said drive means includes a plurality of drive motors, gear means drivingly connecting said motors and said shaft for rotating the latter at a speed dependent on the sum of the speeds of the motors, and means for causing said first signal to be a function of the sum of the motor movements.

One embodiment of the invention will now be described by way of example only and with reference to the accompanying drawings in which.

Figure 1:
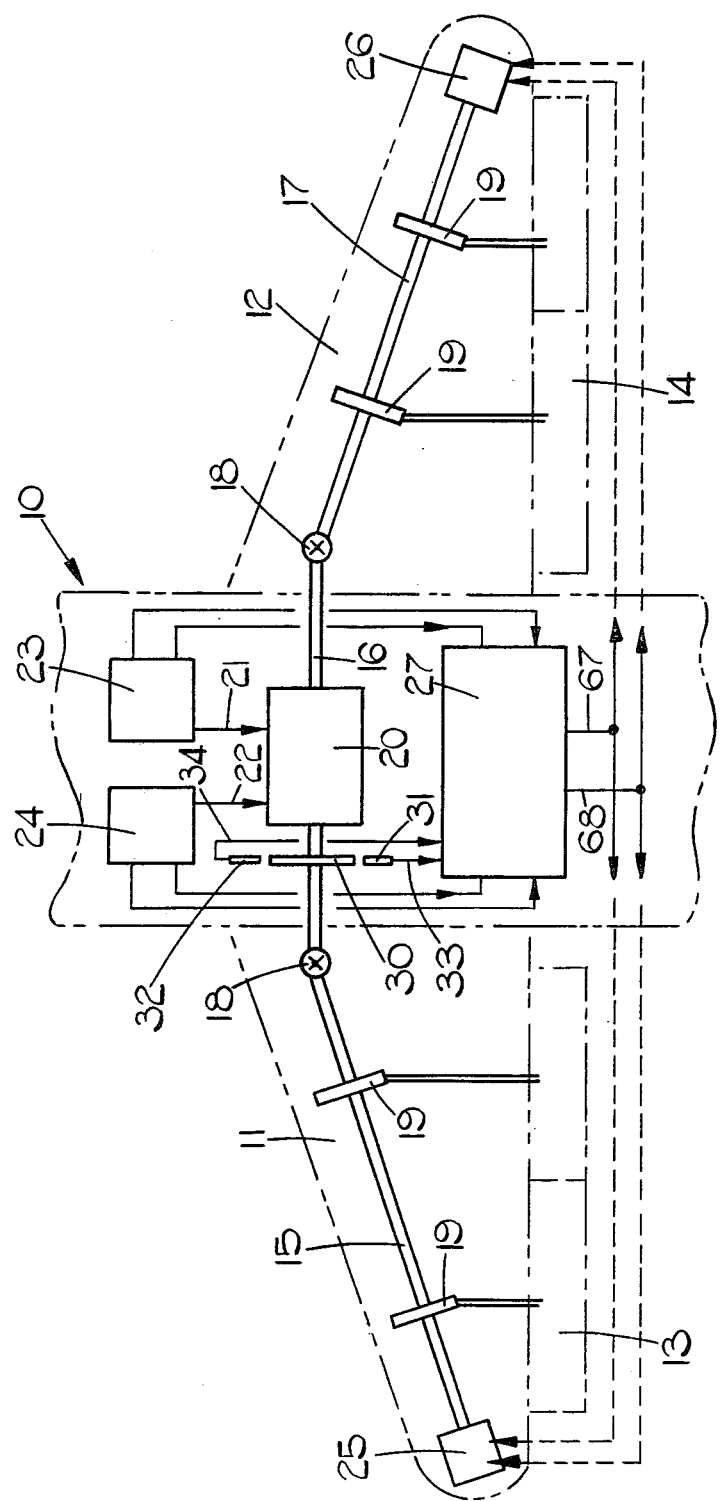
FIG. 1 shows, diagrammatically, an aircraft wing having lift control surfaces and a drive arrangement for said surfaces.
Figure 2:
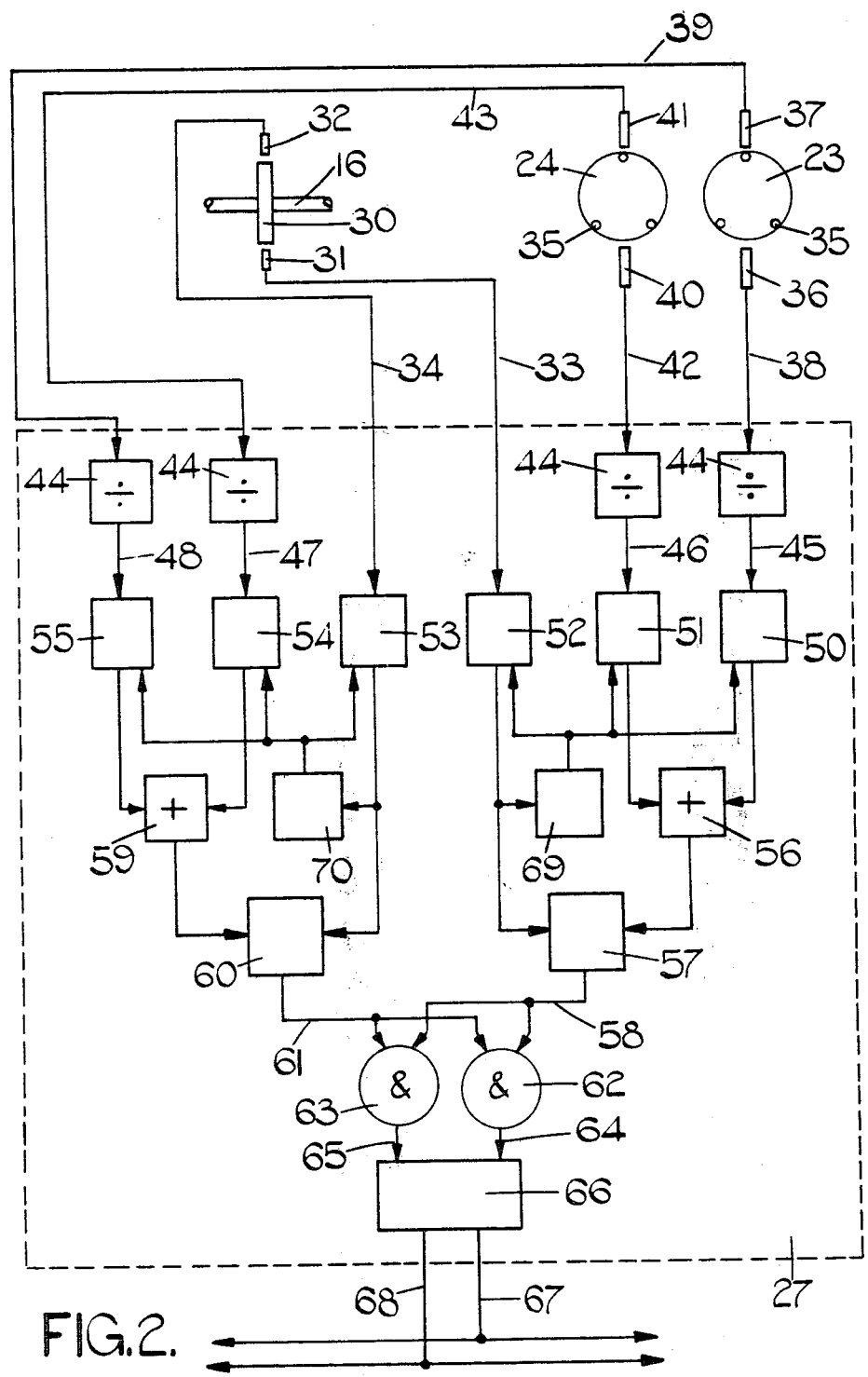
FIG. 2 is a block diagram of part of the drive arrangement of FIG. 1.

As shown in FIG. 1, an aircraft 10 has port and starboard wing sections 11, 12. The wing sections 11, 12 have respective lift control surfaces 13, 14 which are movable in a known manner, to vary the lift of the aircraft wing during certain manoeuvres, for example landing and take-off. For this purpose the surfaces 13, 14 are required to be accurately positioned to move in unison, and to be restrained against movement in the event of a failure of component in an associated drive arrangement.

The surfaces 13, 14 are actuable by a single drive shaft which is formed in sections 15, 16, 17 which are interconnected by universal couplings 18. Actuating devices 19 of a known type are operable to convert rotary motion of the shafts 15, 17 into displacement of the respective surfaces 13, 14.

A differential gear 20 is responsive to rotation of input shafts 21, 22 to rotate the shaft 16 at a speed which is dependent on the sum of the speeds of the shafts 21, 22. Shaft 21, 22 are driven by respective fluid-powered motors 23, 24. The ends of the shafts 15, 17 adjacent the tips of the respective wing sections 11, 12 are provided with braking devices 25, 26, later to be described in detail. The braking devices 25, 26 are responsive to output signals from a control arrangement 27, which is responsive to the rotational position of the motors 23, 24 and of the shaft 16.

Mounted on the shaft 16 for rotation therewith is a disc 30 provided with a plurality of equi-spaced projections (not shown). Two probes 31, 32 are responsive to the passage of these projections as the shaft 16 rotates, to provide, on respective lines 33, 34, trains of pulses whose frequency is dependent on the speed of the shaft 16. The rotor of the motor 23 is provided with three elements 35, which co-operate with probes 36, 37 to provide, on respective lines 38, 39, trains of pulses whose frequency is three times the speed of rotation of the motor 23. Motor 24 has similar elements 35 which co-operate with probes 40, 41 to provide on respective lines 42, 43, trains of pulses whose frequency is three times the speed of the motor 24.

Four dividing circuits 44 are responsive to the signals on the respective lines 38, 42, 43, 39 to provide, on respective lines 45, 46, 47, 48, pulse trains whose frequency is equal to the speed of the rotation of the respective motors 23, 24.

Six digital counters 50, 51, 52, 53, 54, 55 provide counts which are dependent on the numbers of pulses received on respective lines 45, 46, 33, 34, 47 and 48. An adder circuit 56 supplies, to one input of a comparator 57, a count equal to the sum of the values in counters 50, 51. The other input to the comparator 57 is provided by the value in counter 52. Comparator 57 is arranged to provide an output signal on a line 58 when a discrepancy between the values supplied by counter 52 and adder circuit 56 exceeds a predetermined value.

An adder circuit 59 supplies to one input of a further comparator 60 a count equal to the sum of the values in counters 54, 55. The other input of the comparator 60 is provided by the value in count 53. Counter 60 is arranged to provide an output signal on a line 61 when a discrepancy between the counts supplied by counter 53 and adder circuit 59 exceeds a predetermined value.

AND circuits 62, 63 provide output signals on respective lines 64, 65 when signals are present on both of lines 58, 61. A control circuit 66 is responsive to a signal on line 64, to provide an output control signal on a line 67, and is also responsive to a signal on line 65 to provide an output control signal on a line 68. The output control signals on lines 67, 68 are used to operate the braking devices 25, 26 in a manner to be described.

Due to the gear ratio of the differential gear 20, the number of pulses on the lines 33, 34 will not exactly correspond to the sum of the pulses on lines 38, 42 or lines 39, 43. To prevent this discrepancy becoming cumulative and causing spurious signals to appear on lines 58, 61 the counters 50, 51, 52, 53, 54 and 55 are reset to zero every three turns of the shaft 16. This is effected by reset pulse generators 69, 70 which are respectively responsive to the values in counters 52, 53, and which provide reset signals to the counters every three turns of the shaft 16.

In use, therefore the control arrangement 27 provides output signals on the lines 67, 68 when any discrepancy between the driving positions of the motors 23, 24 and the driven position of the shaft 16 exceeds a predetermined value. Duplication of the probes on the motors 23, 24 and the disc 30 together with duplication of elements within the control arrangement 27 has the effect that output signals are provided on lines 67, 68 only when signals from both the comparators 57, 60 indicate that a maximum allowable shaft position discrepancy has been reached. The probability of the braking devices 25, 26 being actuated as a result of electrical failures in the probes or the control arrangement 27, is thereby considerably reduced.

Braking devices 25, 26 are identical, and the device 25 is shown in detail in FIGS. 3, 4, 5 and 6. The device has a housing 71 in which a rotor 72 is journalled, the rotor 72 being drivingly connected to the shaft 15. The rotor 72 is provided with a flange 73 and terminates in a spindle 74. Governor fly-weights 75 are mounted on the rotor 72 and engage a sleeve 76 which surrounds the spindle 74 and is biased against movement by the fly-weights 75 by a spring 77. Supported on the sleeve 76 by means of a bearing 78 is a collar 79. A lever 80 is mounted for movement about a pivot pin 81 which is fixed relative to the housing 71. The lever 80 also pivotally engages the collar 79. One end of the lever 80 abuts a stem 82 which is biased by a spring 83 in a direction to urge the lever 80 clockwise about the pivot pin 81.

The other end of the lever 80 can abut a latch 84 which is pivotally mounted in the housing 71. The latch 84 has an abutment in the form of a roller 85 and is biased by a spring 86 towards a position in which the roller 85 engages an adjustable stop 87, in which position the roller 85 also abuts a plunger 88 to prevent movement thereof in a leftward direction.

Surrounding the rotor 72 and supported by the housing 71 for axial and rotary movement with respect thereto is a cage 90 which maintains six rollers 91 in equi-spaced relationship about the rotor 72. Supported in the housing 71 and surrounding the rollers 91 is a brake ring 92. The brake ring 92 is provided with internal recesses 93 which provide radial clearance for the rollers 91. The ring 92 has an integral lug 94 which is maintained in a central position by a pair of plungers 95 acted upon by identical springs 96. In this position of the brake ring 92 the recesses are positioned so that the ring 92 is not engaged by the rollers 91, which can therefore rotate freely in the cage 90.

Figure 3:
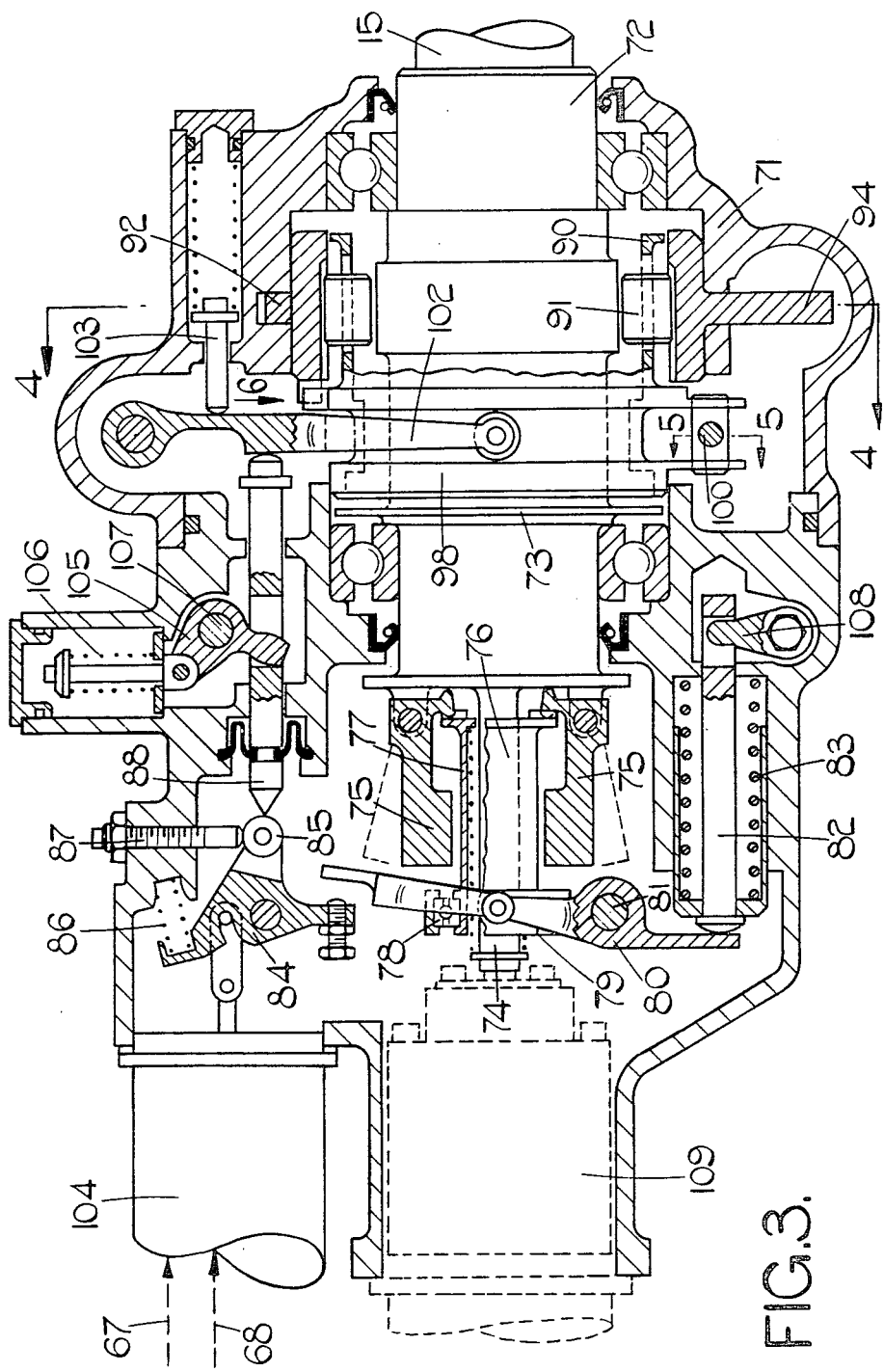
FIG. 3 is a section through a brake forming part of the arrangement of FIG. 1.
Figure 4:
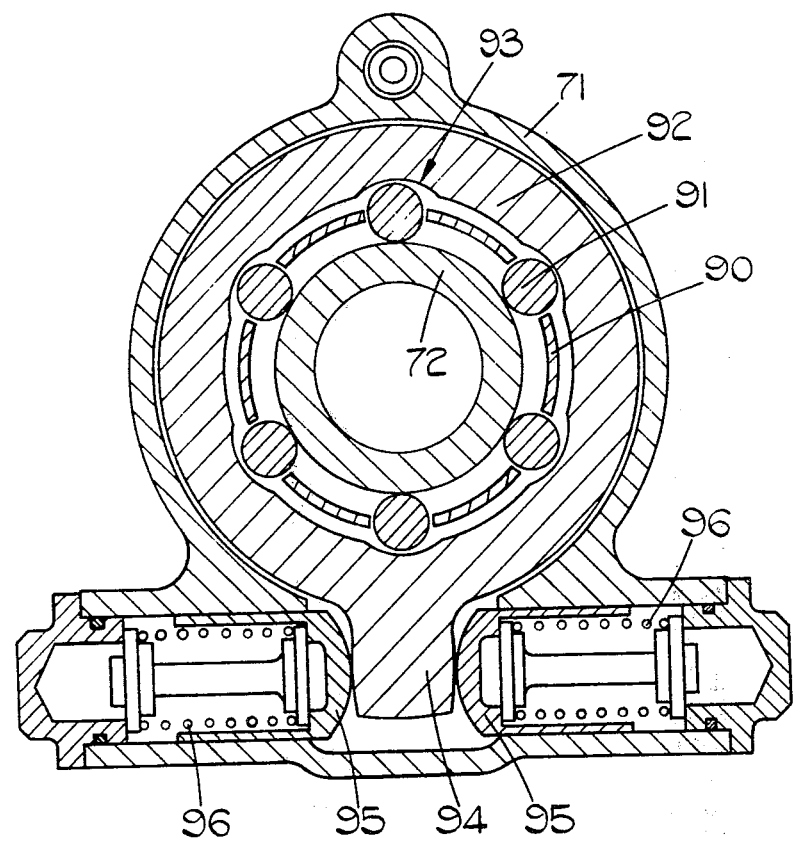
FIG. 4, is a section on line 4—4 in FIG. 3.
Figure 5:
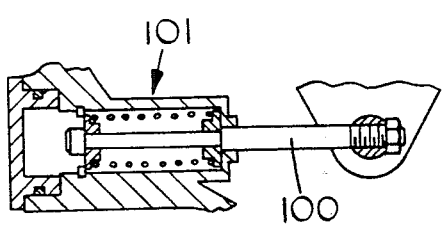
FIG. 5, is a section on line 5—5 in FIG. 3.
Figure 6:
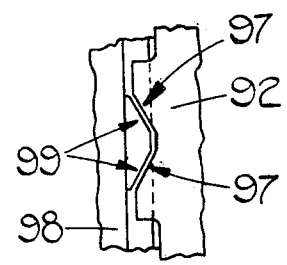
FIG. 6 is a part-view on arrow 6 in FIG. 3.

The brake ring 92 is provided with a plurality of symmetrical ramps 97, a pair of which is shown in FIG. 6. The bearing cage 90 includes a collar portion 98 which includes a plurality of symmetrical ramps 99, also shown in FIG. 6. The ramps 97 and 99 are complementary, and when the cage 90 is in its most rightward position, as shown in FIG. 3, the ramps 97, 99 prevent relative rotation between the cage 90 and brake ring 92, and maintain these elements in a position in which the rollers 91 lie within the recesses 93 of the brake ring 92. The cage 90 is, moreover, urged towards a central position by means of a rod 100 which is acted upon by a spring arrangement 101, shown in detail in FIG. 5.

A stirrup lever 102 is pivotally mounted in the housing 71 and engages the collar portion 98. The lever 102 abuts an end of the plunger 88 so that, when the latch 84 is in the position shown, the collar portion 98 is maintained in its most rightward position. A spring-loaded plunger 103 urges the lever 102 in a direction to move the collar portion 98 into engagement with the flange 73 and to move the ramps 97, 99 out of engagement. This movement of the lever 102 is prevented by the plunger 88 so long as the latch 84 remains in the position shown. In this latter position, therefore, the rollers 91 are free to rotate within the recesses 93 and no braking is applied to the rotor 72 or shaft section 15.

The combined force applied by the springs 77, 83 is such that at normal speeds of rotation of the rotor 72 the fly-weights 75 do not cause the lever 80 to move the latch 84 away from its abutment with the plunger 88. If, however, either of the shaft sections 15, 16 should fracture between the disc 30 and the braking device 25, aerodynamic forces on the surface 13 will cause the shaft portion 15 to rotate at a speed sufficiently high to cause the latch 84 to trip. The plunger 88 then moves leftward under the influence of the plunger 103, moving the ramps 97, 99 out of engagement and permitting relative rotation between the cage 90 and brake ring 92. The collar portion 98 of the cage 90 moves into frictional engagement with the flange 73, thereby rotating the cage 90. The rollers 91 move away from the recesses 93 and jam between the rotor 72 and brake ring 92. The brake ring 92 rotates a short distance against the appropriate one of the plungers 94, 95 which act as shock absorbers. Arrest of the brake ring 92 thus brakes the rotor 72, shaft section 15 and the lift control surfaces 13.

An electro-magnet 104 is provided with two independent windings which are energiseable by the output signals on lines 67, 68 respectively. Energisation of the electro-magnet 104 causes the latch 84 to be moved clockwise, with the braking effect already described.

Movement of the plunger 88 to the left is restrained by a cocking lever 105 which is urged to the position shown by a spring 106. Lever 105 is secured to a spindle 107 which can be manually rotated anti-clockwise to urge the plunger 88 to the right. If, after the rotor 72 has been braked, it is rotated in a direction opposite to that at which braking occurred, this will tend to free the rollers 81, and the spring arrangement 101 (FIG. 5) returns the cage 90 to its central position. The cocking lever 105 can then be manually operated to urge the ramps 97, 99 into engagement and to permit the spring 86 to reset the latch 84.

A test lever 108 is manually operable to move the stem 82 against the spring 83, and thereby to remove the bias of the latter from the lever 80. In this condition the fly-weights 75 are opposed only by the spring 77 and will cause the latch 84 to trip at normal operating speeds of the rotor 72. The lever 107 may thus be used to test over speed response of the device 25.

The brake device 26 can operate in a similar manner to arrest movement of the shaft 17 and control surfaces 14.

The spindle 74 drives a synchro control generator and a synchro differential generator, indicated at 109 in FIG. 3. A similar synchro control generator and synchro differential generator are associated with the braking device 26 and are driven by the shaft section 17. These synchro generators are used to detect asymmetry of operation between the shaft sections 15, 16, and to arrest the motors 23, 24 in response to this asymmetry, as disclosed in British Pat. No. 1,400,449. The drive arrangement disclosed will thus brake both shaft sections 15, 16 if the rotation thereof does not correspond to the driving rotation of one or both of the motors 23, 24. The arrangement will also brake the shaft sections 15, 16 in response to rapid movement thereof by aerodynamic loads on the control surfaces 13, 14, and will be responsive to detection of asymmetry between a braked shaft section and a shaft section which is still operational to arrest the motors 23, 24 and thereby to prevent the operational shaft section from being driven substantially out of alignment with the braked shaft section.

I claim:

1. In an aircraft having a wing, a lift control surface operatively carried by said wing, a drive shaft connected to actuate said control surface, and drive means for said shaft, an arrangement for fixing the position of said control surface in the event of an emergency, comprising means for providing a first electrical signal dependent upon the speed of said drive means, means for providing a second electrical signal dependent upon the speed of said drive shaft, means responsive to the first and second signals for determining a relative positional relationship between the drive means and the drive shaft, means for providing an output signal in response to a predetermined level of difference in the positional relationship between the drive means and the drive shaft, and means responsive to said output signal for restraining said shaft against driving movement.

2. A drive arrangement as claimed in claim 1 in which said drive means includes a plurality of drive motors, gear means drivingly connecting said motors and said shaft for rotating the latter at a speed dependent on the sum of the speeds of said motors, and means for causing said first signal to be a function of the sum of said motor movements.

3. A drive arrangement as claimed in claim 1 which includes two of said means for providing first electrical signals which are functions of driving motion of said drive means, two of said means for providing said second electrical signals, a pair of comparator means, responsive to differences between respective ones of said first electrical signals and respective ones of said second electrical signals, for providing respective control signals, and summing means for providing said output signal only in response to control signals from each of said comparator means.

4. A drive arrangement as claimed in claim 1 in which said restraining means includes means responsive to the speed at rotation of said shaft.

5. A drive arrangement as claimed in claim 1 in which said shaft comprises separate sections joined by universal joints, and said restraining means comprises a plurality of braking devices cooperating with respective sections of said shaft.

6. A drive arrangement as claimed in claim 1 in which said restraining means comprises a brake device including a rotor drivingly connected to said shaft, a member restrained against rotation, a braking element having an operative position in which it engages both said rotor and said member, and an inoperative position, means for maintaining said braking element in said inoperative position, and actuator means for urging said braking element away from said inoperative position, said actuator means being responsive to said output signal.

7. A drive arrangement as claimed in claim 6 in which said actuator means is also responsive to a predetermined speed of said shaft.

8. A drive arrangement as claimed in claim 6 in which said actuator means includes means for biasing said braking element away from its inoperative position, and a latch device opposing movement of said braking element by said biasing means, said latch device being responsive to said output signal and to a predetermined speed of said shaft.

9. A drive arrangement as claimed in claim 7 which includes means for rendering said actuator means operative in the event of severance of said shaft from its drive means at a shaft speed lower than said predetermined speed.

* * * * *